United States Patent [19]

Yamada

[11] 4,319,268

[45] Mar. 9, 1982

[54] REPRODUCTION PICTURE SHARPNESS EMPHASIZING METHOD

[75] Inventor: Mitsuhiko Yamada, Kyoto, Japan

[73] Assignee: Dainippon Screen Seizo Kabushiki Kaisha, Kyoto, Japan

[21] Appl. No.: 164,556

[22] Filed: Jun. 30, 1980

[30] Foreign Application Priority Data

Jul. 2, 1979 [JP] Japan .................................. 54-82571

[51] Int. Cl.³ .............................................. H04N 1/46
[52] U.S. Cl. .................... 358/75; 358/21 R; 358/80
[58] Field of Search ..................... 358/21, 75, 79, 80

[56] References Cited

U.S. PATENT DOCUMENTS 2,962,548  11/1960  Taudt .
3,153,698  10/1964  Hall et al. .
3,194,882   7/1965  Hall .
3,194,883   7/1965  Ross .
3,194,884   7/1965  Ross et al. .
4,058,828  11/1977  Ladd ...................................... 358/80

Primary Examiner—Richard Murray
Attorney, Agent, or Firm—Michael A. Painter

[57] ABSTRACT

A sharpness emphasizing method of a reproduction picture for use in a picture reproducing machine such as a color scanner or a color facsimile, wherein an original picture is scanned to pick up a picture signal which is separated into color separation picture element signals of primary colors, and wherein a reproduction picture is reproduced by using the color separation picture element signal, in which a main picture element signal whose sharpness is to be emphasized, and supplemental picture element signals positioned around the main picture element signal are picked up, in which the supplemental picture element signals picked up are weighted with factors in such a manner that the supplemental picture element signals positioned in the same distance away from the main picture element signal may be weighted with the same factor, and the supplemental picture element signals weighted are averaged to obtain a mean value signal, and in which the main picture element signal is emphasized according to the mean value signal.

8 Claims, 13 Drawing Figures

REPRODUCTION PICTURE SHARPNESS EMPHASIZING METHOD

BACKGROUND OF THE INVENTION

This invention relates to a sharpness emphasizing method of a reproduction picture for use in a picture reproducing machine such as a color scanner, a color facsimile, or the like.

In a conventional picture reproducing machine, a sharpness emphasizing method of a reproduction picture is carried out by using picture signals to be processed or circumferential information of the picture signals.

The former case has a disadvantage, that is, the sharpness emphasis effect is obtained only in the scanning direction of the cylinder's circumference, and hence such a method cannot be applied independently to a color scanner for plate-making, or the like.

In the latter case, as shown in FIG. 1, a light beam 1 obtained by scanning an original picture optically, is divided into two components by a half mirror 2. Each light beam propagates along a light axis $3a$ or $3b$ through an aperture $5a$ or $5b$ having an opening distance $d_1$ or $d_2$, which is formed in a mask $4a$ or $4b$.

Each light beam through the opening $5a$ or $5b$ is incident to a photoelectric element $6a$ or $6b$ which converts the light beam into a signal. Thus the obtained signal is then converted into a density signal in a logarithmic amplifier $7a$ or $7b$ including a preamplifier, thereby obtaining a picture signal A or B.

The picture signal A through the smaller aperture $5a$ is a so-called sharp signal whose sharpness is to be emphasized. The picture signal B through the larger aperture $5b$ is usually called an unsharp signal which includes the circumferential information of the sharp signal A.

However, in the embodiment shown in FIG. 1, in fact, the light beam through the aperture $5a$ is color-separated into red, green and blue colors by half mirrors to obtain three picture signals $A_R$, $A_G$ and $A_B$, and the picture signal $A_G$ is selected as the picture signal A.

In order to emphasize the sharpness of a recording signal by using the sharp signal A ($A_G$) and the unsharp signal B, the unsharp signal B is subtracted from the sharp signal A to obtain an unsharp masking signal C in a differential amplifier 8. Then, the unsharp masking signal C is added to the sharp signal A ($A_R$, $A_G$ or $A_B$) in a summing amplifier 9 which outputs a sharpness-emphasized picture signal D ($D_R$, $D_G$ or $D_B$), as shown in FIG. 2.

This sharpness emphasizing method of the picture signal is now widely used. However, this method requires a special system having an optical system and an electric operational circuit, for obtaining the unsharp signal B, which is inconvenient and high cost. Further, in this method, by varying the shape of the aperture $5b$ of the mask $4b$ the sharpness in certain directions may be emphasized, and by varying the opening distance $d_2$ of the aperture $5b$ the sharpness range may be varied. However, various masks are required for these variations.

The opening distance $d_1$ of the aperture $5a$ of the mask $4a$ for the sharp signal A is determined depending on the resolving power of the sharp signal A. When the distance $d_1$ of the aperture $5a$ is varied according to a reproducing magnification and so forth, the distance $d_2$ of the aperture $5b$ must be changed, and accordingly sets of masks $4a$ and $4b$ must be prepared depending on the resolving power of the sharp signal A.

The sharpness emphasizing operation will be explained theoretically in connection with space frequency-response curves shown in FIG. 3. There are shown two slit functions f(A) and f(B) having widths $d_1'$ and $d_2'$, corresponding to the aperture sizes $d_1$ and $d_2$ of the apertures $5a$ and $5b$ are shown in FIG. 3a. In order to obtain the space frequency-response curves, or the spectrum distributions F(A) and F(B), which includes a space frequency range sensible to the eyes of human beings, the slit functions f(A) and f(B) are performed by Fourier transformation, as shown in FIG. 3b wherein F(u) means a spectrum value corresponding to a space frequency u.

As shown in FIG. 2, the unsharp masking signal C is A−B, and the sharpness-emphasized picture signal D is A+C. Thus, the spectrum distributions F(C) and F(D) corresponding to the unsharp masking signal C and the sharpness-emphasized picture signal D are expressed as F(A)−F(B) and F(A)+F(B), as shown in FIG. 3b.

Such spectrum distributions are shown in the X axis direction, as shown in FIG. 3a, and the same spectrum distributions are obtained in the Y axis direction. In the X=Y axis direction, the similar spectrum distribution is obtained, as shown in FIG. 3c wherein the aperture size d may be $d_1'$ or $d_2'$, but the points wherein F(u) equals naught, are different. In practice, in this case, the distribution may be considered as almost the same as the one in the X or the Y direction.

Therefore, on the contrary, the slit functions f(x) may be obtained from the spectrum distribution corresponding to the desired sharpness emphasizing characteristics in the reverse manner.

Consequently, as shown in FIG. 4, wherein d is the opening size of the aperture or the width of the scanning line, from the spectrum distribution F(D') of the sharpness-emphasized picture signal D' the spectrum distribution F(C') of the unsharp masking signal C' is given by F(D')−F(A), and the spectrum distribution F(B') of the ideal unsharp signal B' is obtained by (F(A)−F(C')). Then, the spectrum distribution F(B') is performed by reverse Fourier transformation to obtain the slit function f(B') corresponding to the ideal unsharp signal B'. According to the slit function f(B') obtained the aperture $5b$ of the mark $4b$ is formed, and the transmittance of the light through such an aperture $5b$ is continuously reduced radially from its center according to the slit function f(B').

In FIG. 4 is shown one example of a wave form of such a slit function, and, in practice, the wave form is exactly determined from the slit function.

In this method, a plurality of masks, each having such an aperture, must be prepared in advance, depending on the opening size $d_1$ of the aperture. However, since the aperture size is minute, and the variation of the light transmittance of the aperture is effected by using the photographic technique, in practice, it is quite difficult to control the light transmittance of the minute aperture area.

SUMMARY OF THE INVENTION

Therefore, it is an object of the present invention to provide a sharpness emphasizing method of a reproduction picture for use in a picture reproducing machine, free from the aforementioned defects, which carries out the sharpness emphasizing operation electronically and does not require a plurality of masks, and which is simple and reliable and is operated quickly.

According to the present invention, there is provided a sharpness emphasizing method of a reproduction picture for use in a picture reproducing machine wherein an original picture is scanned to pick up a picture signal which is separated into color separation picture element signals of primary colors, and wherein a reproduction picture is reproduced by using the color separation picture element signal, comprising the steps of (a) picking up a main picture element signal whose sharpness is to be emphasized, and supplemental picture element signals positioned around the main picture element signal, (b) weighting the supplemental picture element signals with factors in such a manner that the supplemental picture element signals positioned in the same distance away from the main picture element signal may be weighted with the same factor, (c) averaging the supplemental picture element signals weighted to obtain a mean value signal, and (d) emphasizing the main picture element signal according to the mean value signal.

BRIEF DESCRIPTION OF DRAWINGS

In order that the present invention may be better understood preferred embodiments will now be described with reference to the accompanying drawings, in which.

DESCRIPTION OF PREFERRED EMBODIMENTS

Figure 5:
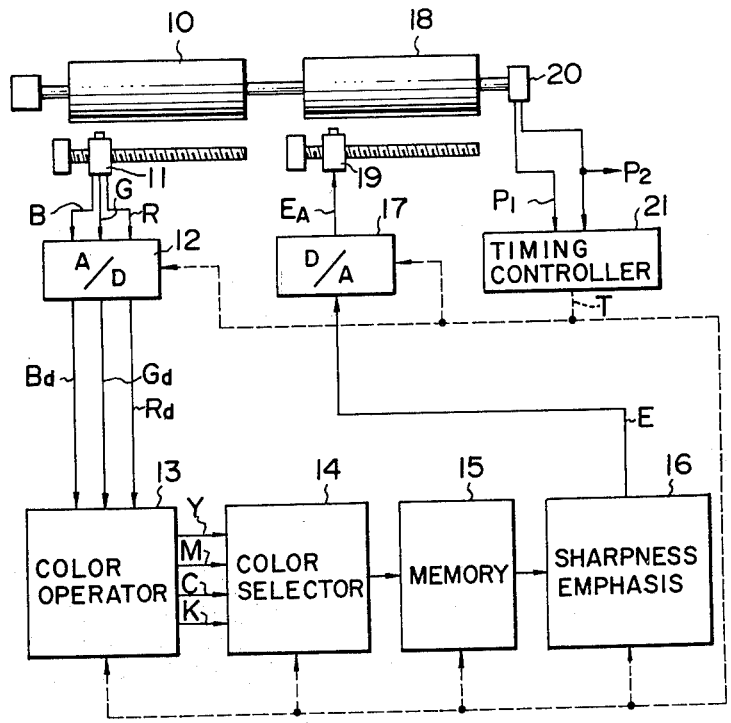
FIG. 5 is a schematic view of a color scanner to which the present invention is applied.

There is shown in FIG. 5 a digital color scanner to which a sharpness emphasizing method according to the present invention is applied.

An original picture secured to a picture cylinder 10 is scanned photoelectrically and is then color-separated by a scanning picture head 11 to obtain color separation analog signals B, G and R of primary colors such as blue, green and red. The color separation analog signals B, G and R are sent to an analog-digital converter 12 and are converted there into color separation digital signals Bd, Gd and Rd.

The color separation digital signals Bd, Gd and Rd are sent to a color operator 13 wherein a color control operation such as masking, color correction, tone control, and so forth, is performed, and are converted there into yellow, magenta, cyan and black color picture signals Y, M, C and K. Each picture signal Y, M, C or K is selected in a color selector circuit 14, and is sent to a memory 15 in order to be stored therein.

In the memory 15, the density information near the scanning points, which is necessary for a sharpness emphasis circuit 16 hereinafter mentioned, is stored in advance, and the information is read out of the memory 15 in the read-out timing which is different from the writing timing. The memory 15 is acted as a buffer memory for the magnification conversion, and the like.

The information read out of the memory 15 is sent to the sharpness emphasis circuit 16. The sharpness emphasis circuit 16 carries out the sharpness emphasizing operation, so hereinafter described, thereby obtaining a sharpness-emphasized digital picture signal E. The sharpness-emphasized digital picture signal E is sent to a digital-analog converter 17 and is converted there into an sharpness-emphasized analog picture signal $E_A$ which is sent to a scanning exposure head 19 in order to reproduce a reproduction picture on a recording film mounted to a recording cylinder 18.

A pulse generator 20 of a conventional type, which is coaxially arranged with the cylinders 10 and 18 on a pivot shaft, generates a timing pulse $P_1$ and a one-rotation pulse $P_2$ and sends the pulses $P_1$ and $P_2$ to a timing controller circuit 21. The timing controller circuit 21 generates a clock pulse T by which the operations of the analog-digital converter 12, the color operator 13, the color selector circuit 14, the memory 15, the sharpness emphasis circuit 16, the digital-analog converter 17, and so forth, are synchronized in a conventional manner.

Figure 6:
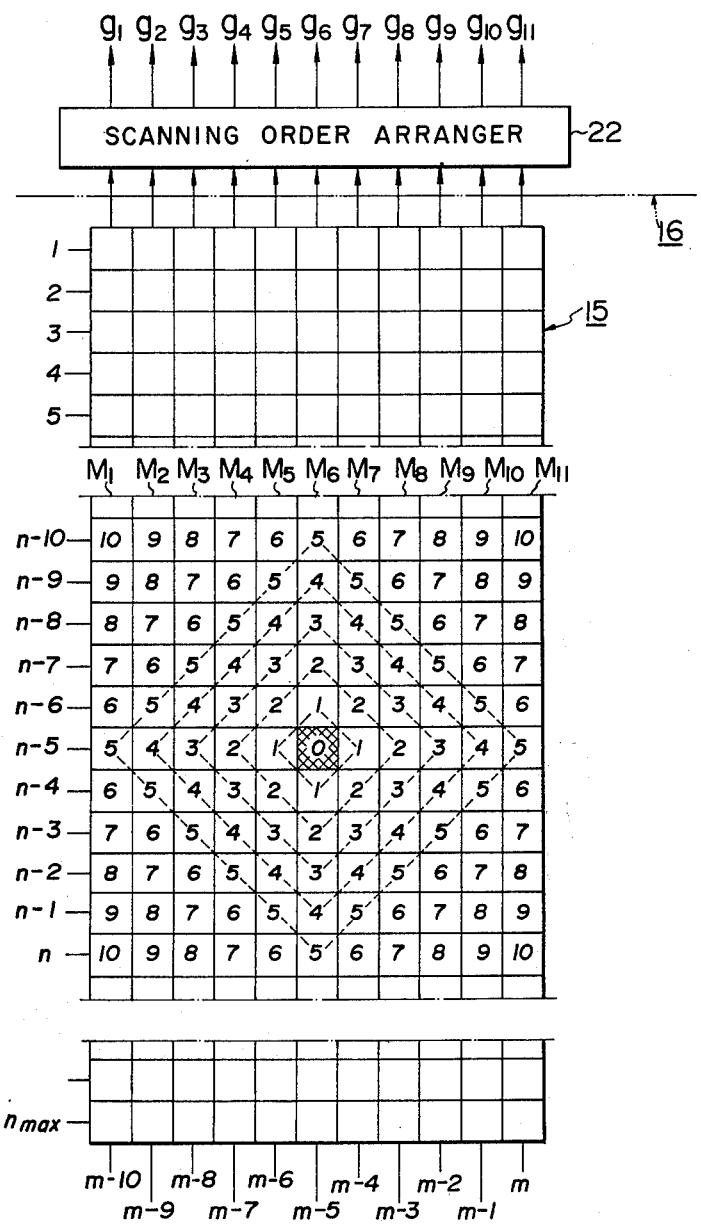
FIG. 6 is a memory map of a memory comprising memory blocks, shown in FIG. 5.

In FIG. 6, there is shown a memory map of the memory 15 comprising eleven memory blocks $M_1$–$M_{11}$ corresponding to the consecutive eleven scanning line numbers m-10-m, each block having addresses 1-$n_{max}$ corresponding to picture element signals of one scanning line in the direction of the cylinder's periphery. The numerals 0–10 appeared in the address range (n−10)–n of the memory blocks $M_1$–$M_{11}$ indicate position numbers which are determined at will according to the slit function f(x) in FIG. 4. Each position number represents a certain distance away from the central point 0 (wherein x−0) which is positioned in the address n-5 of a memory block corresponding to the center of the consecutive eleven scanning line numbers, in this embodiment, the memory block $M_6$ of the scanning line number m-5. The picture element in the central point 0 is surrounded round and round by groups of picture elements having the same position number which increases depending on the distance away from the central point. The picture element signals having the same position number are multiplied by the same damping factor K when the sharpness-emphasized picture signal E is obtained, as hereinafter described.

In the writing mode of the memory 15, the picture signals are consecutively stored in the memory blocks $M_1$–$M_{11}$ in order of their address numbers and the memory block numbers. After the eleventh memory block $M_{11}$ is fully stored with the picture signals, it returned to the first memory block $M_1$ and the same writing operation is repeated.

In the embodiment shown in FIG. 6, the picture signals of scanning lines (m−10)–(m−1) are already stored in the memory blocks $M_1$–$M_{10}$, and the picture signals of the scanning line m are now being stored in the memory block $M_{11}$.

In the reading out mode of the memory 15, eleven picture signals, one from each memory block of a common address number, are consecutively read out in the same time in order of their address numbers. The eleven picture signals read out are fed to a scanning order arranger 22.

The scanning order arranger 22 so rearranges the eleven picture signals as they may be put in order of their scanning line numbers, thereby outputting picture signals $g_1$–$g_{11}$ in order of their suffix numbers. For example, if the picture signals of the scanning line number m+1 are stored in the memory block $M_1$, the picture signals read out of the memory blocks $M_2$–$M_{11}$ and $M_1$, one signal is read out of each block, corresponding to the scanning line numbers (m−9)−(m+1) are rearranged and output as the picture signals $g_1$–$g_{11}$ in order of their suffix numbers.

Figure 7:
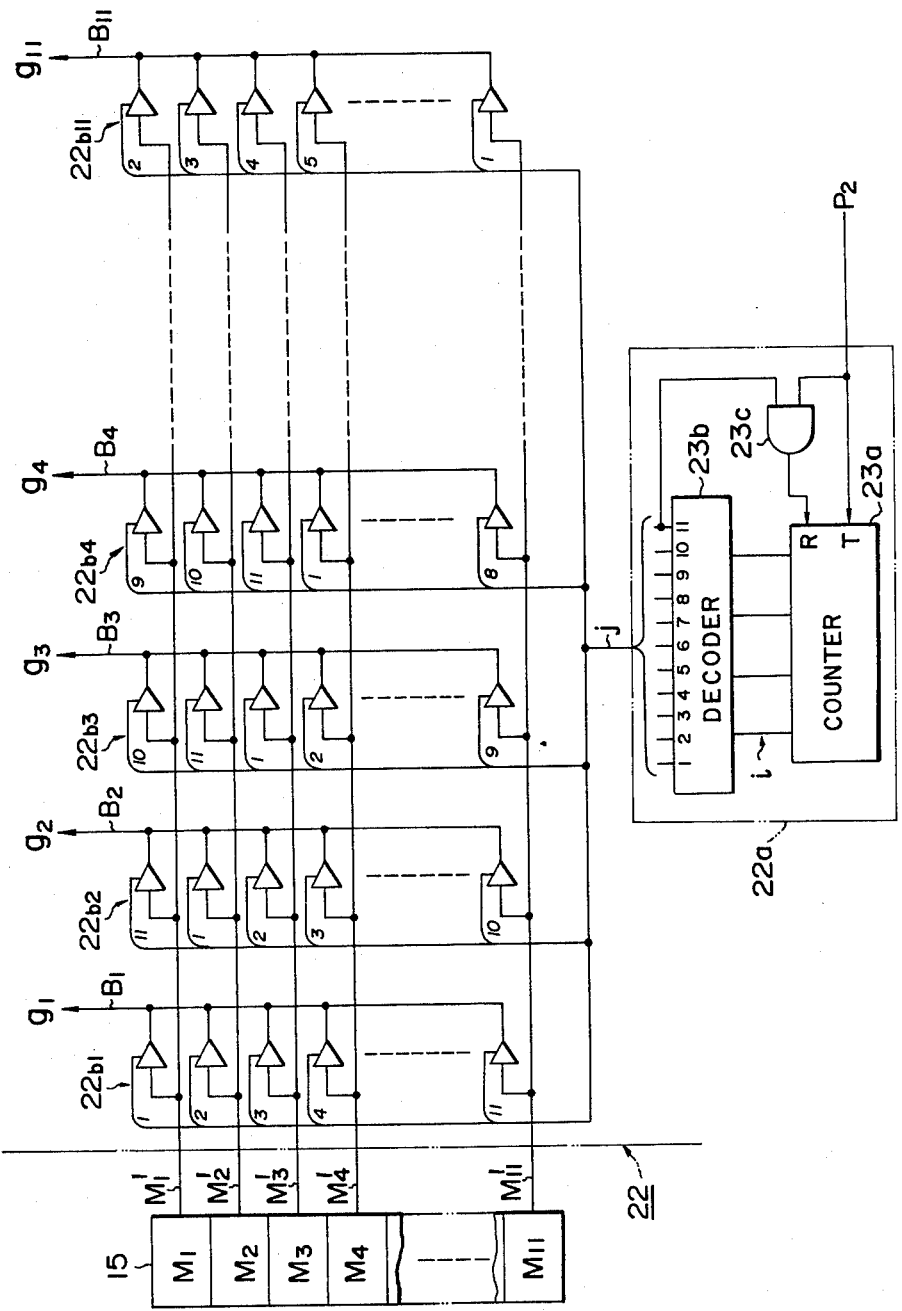
FIG. 7 shows an embodiment of a scanning order arranger of a sharpness emphasis circuit shown in FIG. 6.

In FIG. 7 is shown one embodiment of the scanning order arranger 22 which comprises a base-11 ring counter 22a comprising a binary counter 23a, a decoder 23b, and an AND gate 23c, and eleven data selectors $22b_1$–$22b_{11}$, each comprising eleven tri-state bus buffers or gate circuits, whose output lines are connected to a bus line $B_1, \ldots, B_{10}$ or $B_{11}$. The output bus lines $M_1'$–$M_{11}'$ of the memory blocks $M_1$–$M_{11}$ are connected in parallel to the bus buffers of each data selector.

The binary counter 23a counts the one-rotation pulses $P_2$ generated by the pulse generator 20 and outputs a binary code i to the decoder 23b. When the eleventh output signal of the decoder 23b and the one-rotation pulse $P_2$ are fed to the AND gate 23c, the AND gate sends a reset signal to the counter 23a so as to reset the counter 23a.

The eleven output lines of the decoder 23b are connected to the bus buffers of each data selectors $22b_1$–$22b_{11}$, and the output line numbers of the decoder 23b are periodically shifted by one in order of the row of the data selectors with respect to the memory blocks $M_1$–$M_{11}$ or the bus lines $M_1'$–$M_{11}'$. Thus, when the decoder 23b outputs a selection signal j to the data selectors, the picture signals fed to the bus buffers, corresponding to the output line number of the selection signal j, of the data selectors are selected to be passed therethrough to the bus lines $B_1$–$B_{11}$, that is, the picture signals $g_1$–$g_{11}$ which are rearranged in order of the scanning line numbers, are output to the bus lines $B_1$–$B_{11}$.

Figure 8:
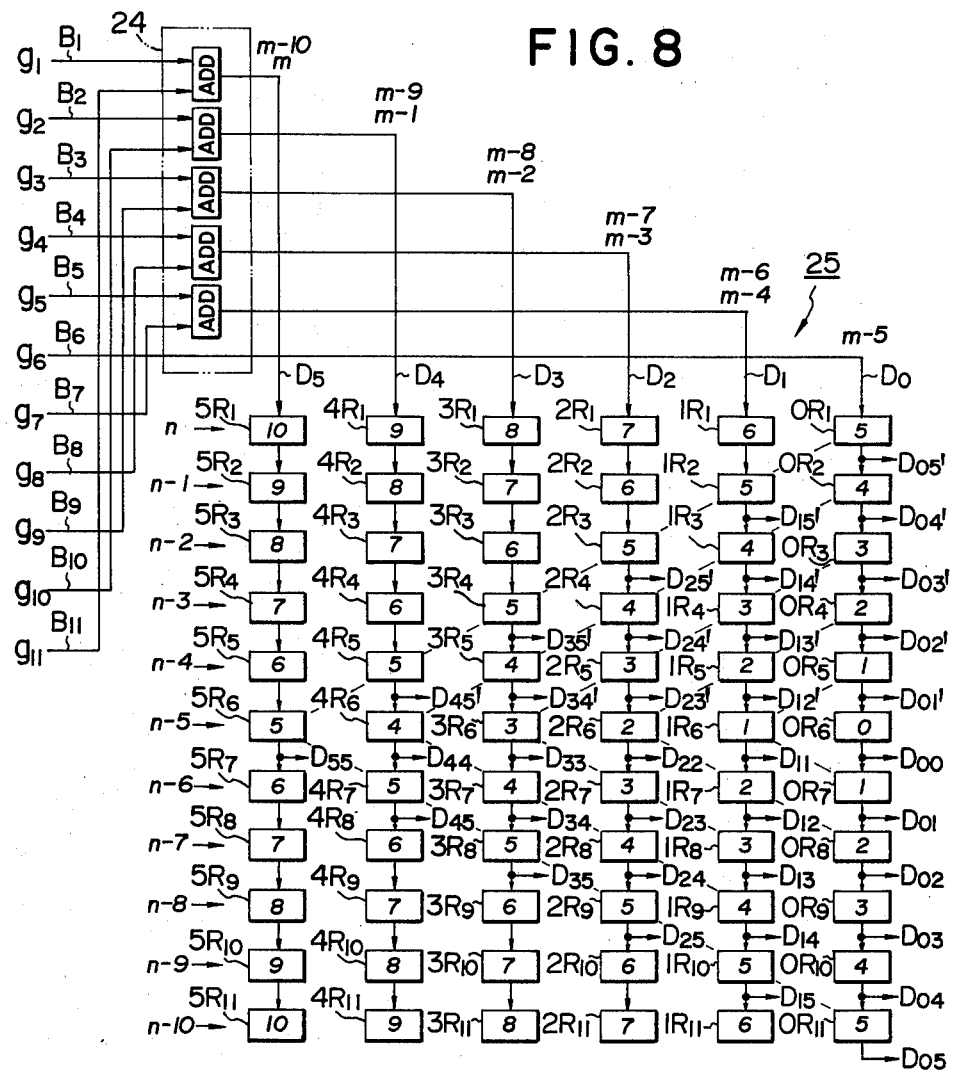
FIG. 8 shows a symmetrical points signals superposing circuit and a circumferential information pickup circuit of the sharpness emphasis circuit in FIG. 5.

In FIG. 8 there are shown a symmetrical points signals superposing circuit 24 and a circumferential information pickup circuit 25 connected thereto in the former part of the sharpness emphasis circuit 16.

The symmetrical points signals superposing circuit 24 comprises five binary code adders wherein as the picture signal $g_6$ representing the central scanning line is an axis of symmetry, the picture signals $g_5$ and $g_7$; $g_4$ and $g_8$; $g_3$ and $g_9$; $g_2$ and $g_{10}$; and $g_1$ and $g_{11}$, each pair being arranged in the symmetrical positions of the picture signal $g_6$, are added, and then the resulting values are averaged by omitting the lowermost bits.

The picture signal $g_6$ together with the mean values which are output from the symmetrical points signals superposing circuit 24, are sent to the circumferential information pickup circuit 25 as input signals $D_0$–$D_5$.

The circumferential information pickup circuit 25 comprises six rows of data register units, each unit comprising eleven shift registers which are connected one another in series; first unit–sixth unit are $0R_1$–$0R_{11}$, $1R_1$–$1R_{11}$, $2R_1$–$2R_{11}$, $3R_1$–$3R_{11}$, $4R_1$–$4R_{11}$, and $5R_1$–$5R_{11}$. As shown in FIG. 8, the position numbers attached to the shift registers $0R_1$–$5R_{11}$ so correspond to those of FIG. 6 as the first shift registers $0R_1$, $1R_1$, $2R_1$, $3R_1$, $4R_1$ and $5R_1$ and the eleventh ones $0R_{11}$, $1R_{11}$, $2R_{11}$, $3R_{11}$, $4R_{11}$ and $5R_{11}$ correspond to the addresses n-10 of the memory blocks $M_6$, $M_5$, $M_4$, $M_3$, $M_2$ and $M_1$ and the addresses n of the same. Although the circumferential information pickup circuit 25 is composed of the shift registers, however, of course, it may be composed of other parts instead of the shift registers.

The input signals $D_0$–$D_5$ are fed to the first shift registers $0R_1$, $1R_1$, $2R_1$, $3R_1$, $4R_1$ and $5R_1$ of the six register units, respectively. The picture element signals are adapted to be picked up from the all shift registers in the same time.

Now, when the picture element signals stored in the address n of the memory 15 shown in FIG. 6 are registered in the first shift registers $0R_1$, $1R_1$, $2R_1$, $3R_1$, $4R_1$ and $5R_1$ of the register units, the picture element signals stored between the addresses (n−10)−n of the memory 15 are all registered in the shift registers $0R_1$–$5R_{11}$ of the circumferential pickup circuit 25, as shown in FIG. 8.

The shift register $0R_6$ of the first data register unit, which is positioned in the central point, outputs a main signal $D_{00}$ whose sharpness is to be emphasized, and the other shift registers $0R_1$–$5R_{11}$ except the one $0R_6$ output picture element signals, as shown in FIG. 8.

Figure 4:
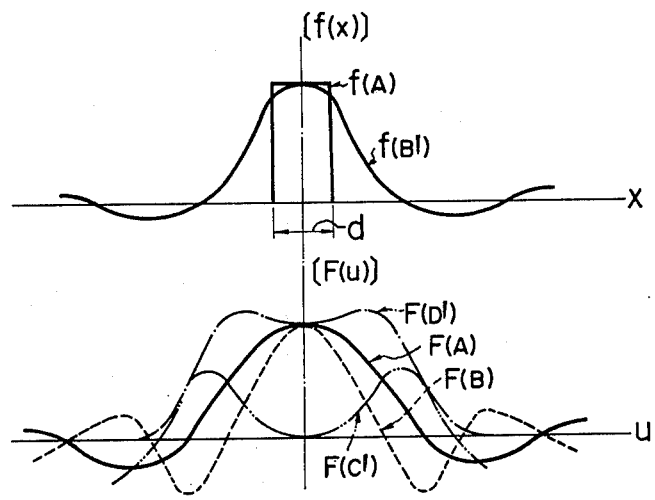
FIG. 4 shows slit functions corresponding to apertures for a sharp signal and an ideal unsharp signal, and spectrum distributions obtained therefrom.
Figure 9:
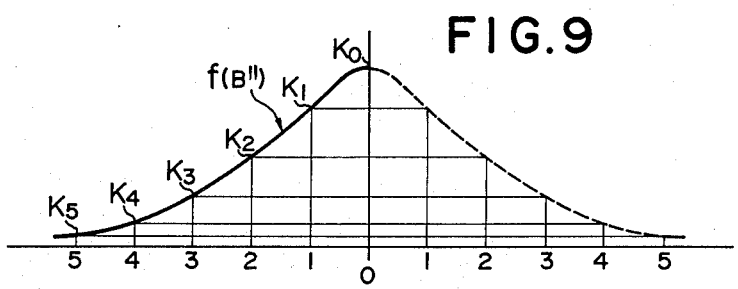
FIG. 9 shows a slit function and its damping factors, corresponding to an ideal unsharp signal.

In FIG. 9 is shown a slit function $f(B'')$ which is similar to the slit function $f(B')$ in FIG. 4, for obtaining the ideal unsharp signal, in the direction of the address number n-5 in FIG. 8, wherein damping factors $K_0$, $K_1$, $K_2$, $K_3$, $K_4$ and $k_5$ correspond to the position numbers 0, 1, 2, 3, 4 and 5 of the picture elements. The right half of the slit function $f(B'')$ is folded up the left half thereof along the Y axis and only the half part of the slit function $f(B'')$ shown by a solid line is processed, as hereinafter described. The slit function $f(B'')$ extends also in the direction of time axis or address numbers.

Figure 10:
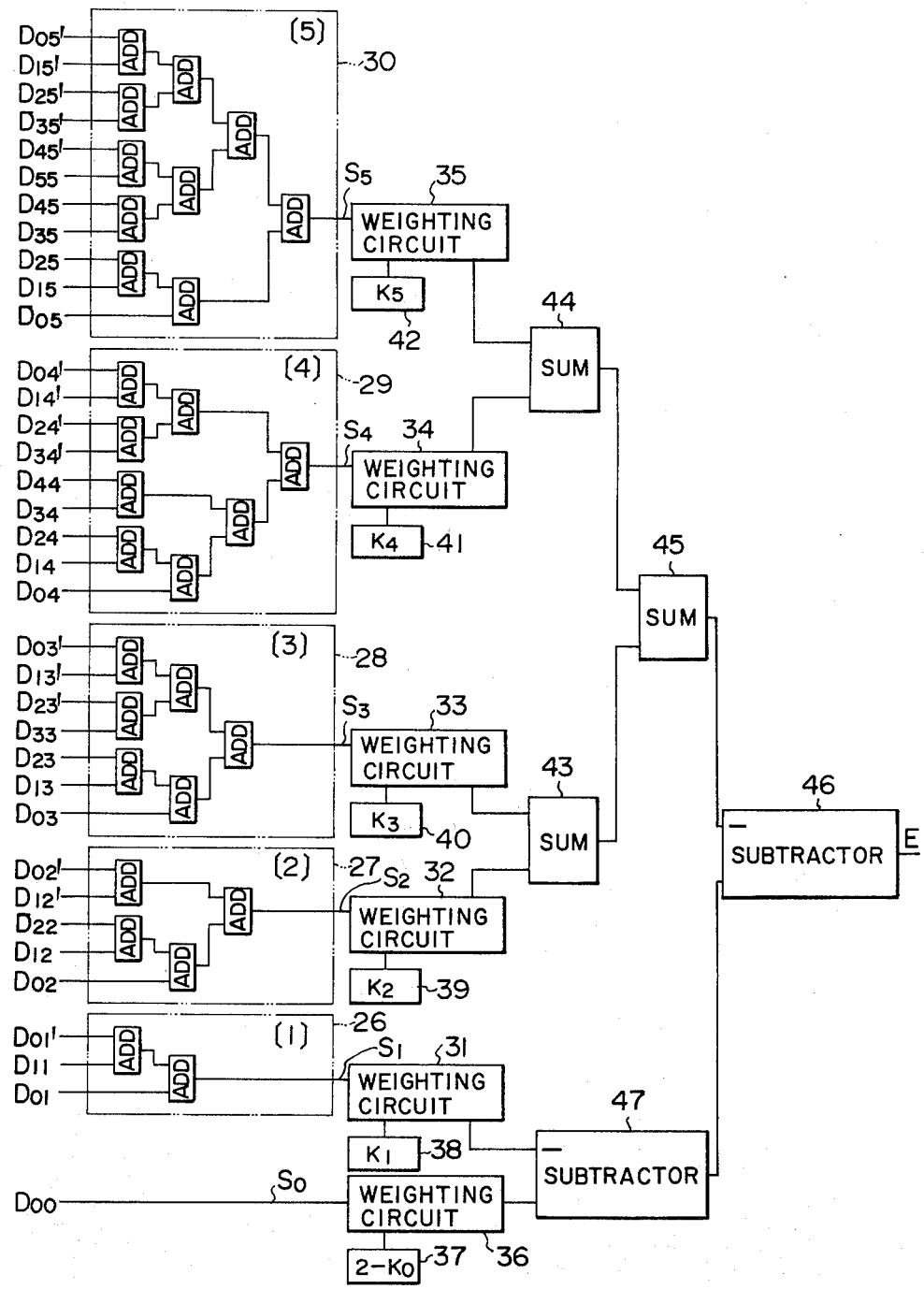
FIG. 10 is a block diagram of a sharpness-emphasized picture signal producer.

In FIG. 10, there is shown a sharpness-emphasized picture signal producer which produces the sharpness-emphasized picture signal E from the picture element signals which are output from the shift registers having the position numbers 0–5.

The groups of picture element signals ($D_{01}''D_{11}'D_{01}$), ($D_{02}''D_{12}''D_{22}'D_{12}D_{02}$), ($D_{03}''D_{13}''D_{23}''D_{33}'D_{23}'D_{13}'D_{03}$), ($D_{04}''D_{14}''D_{24}''D_{34}''D_{44}'D_{34}'D_{24}'D_{14}'D_{04}$), and ($D_{05}''D_{15}''D_{25}''D_{35}''D_{45}''D_{55}'D_{45}'D_{35}'D_{25}'D_{15}'D_{05}$), each group comprising the element signals having the same position number, are fed to add-average circuits 26–30, which consist adders. In each add-average circuit 26, 27, 28, 29 or 30, the picture element signals are averaged to obtain a composite signal $S_1$, $S_2$, $S_3$, $S_4$ or $S_5$ which represents the mean value of the circumferential density information of the picture elements positioned in the same distance away from the central point 0.

From the main signal $D_{00} = S_0$, these composite signals $S_1$–$S_5$ and the damping factors $K_0$–$K_5$ shown in FIG. 9, the unsharp signal U is obtained by the following formula.

$$U = K_0 S_0 + K_1 S_1 + K_2 S_2 + K_3 S_3 + K_4 S_4 + K_5 S_5 \ldots \quad (1)$$

If the sum of the items including the damping factors $K_1$–$K_5$ is expressed U', the following formula is given.

$$U = K_0 S_0 + U' \ldots \quad (2)$$

Figure 1:
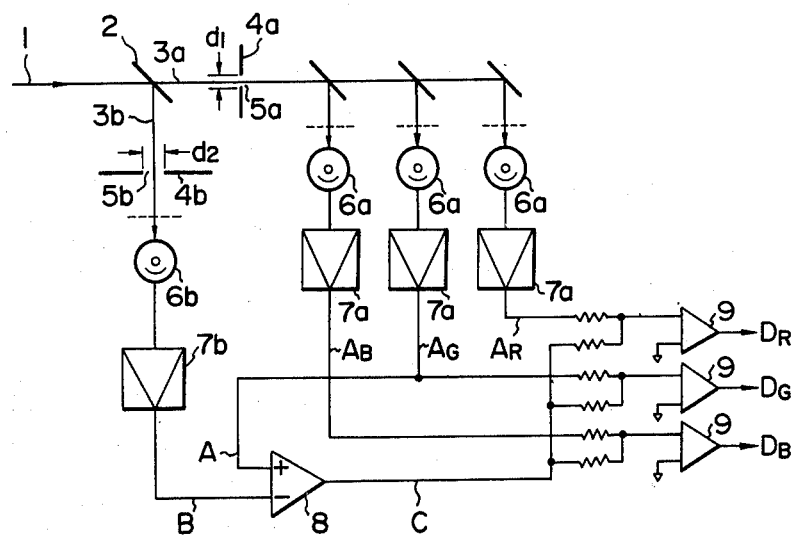
FIG. 1 is a schematic view of a system for performing a conventional sharpness emphasizing method.
Figure 2:
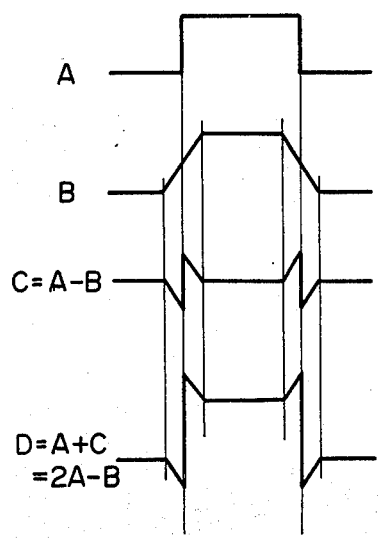
FIG. 2 is a schematic view of signal wave forms appeared in FIG. 1.
Figure 3A:
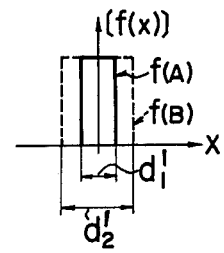
FIGS. 3a–c show slit functions corresponding to apertures shown in FIG. 1 and spectrum distributions which may be obtained from the slit functions by performing Fourier transformation.
Figure 3C:
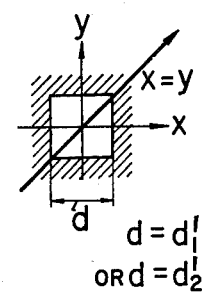
Figure 3B:
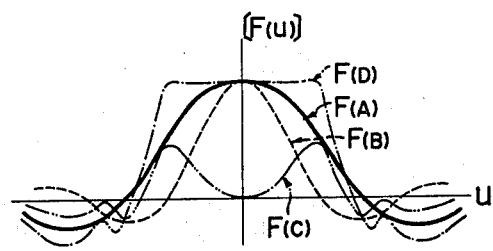

When the equation (D=A+C=A+A−B=2A−B) described above in connection with FIG. 2 is considered, the sharpness-emphasized picture signal E is given in the following formula.

$$\begin{aligned}E &= 2S_0 - U = 2S_0 - K_0 S_0 - U' = S_0(2 - K_0) - U' \quad (5)\\ &= S_0(2 - K_0) - (K_1 S_1 + K_2 S_2 + K_3 S_3 + K_4 S_4 + K_5 S_5)\end{aligned}$$

This calculation is performed by the sharpness-emphasized picture signal producer in FIG. 10. The composite signals $S_1$–$S_5$ are weighted by the damping factors $K_1$–$K_5$ in weighting circuits 31-35, respectively. The main signal $S_0$ is also weighted by a factor 2-$K_0$ in a weighting circuit 36. The factors 2-$K_0$, $K_1$, $K_2$, $K_3$, $K_4$ and $K_5$ are settled by factor settler 37-42 such as a dual in-line package switch, or the like.

If an approximate value to the slit function f(B″) of FIG. 9 is obtained, for instance, the dampng factors $K_0$–$K_5$ may be settled to the fixed values such as 1, ½, ¼, ⅛, 1/16, 1/32, or 1, 1, ½, ¼, ⅛, 1/16, and the divisions may be carried out by omitting the lowermost bit or bits of the binary codes in the weighting circuits 31-36.

The output signals from the weighting circuits 32-35 are summed up by the sum means 43-45, and the summed value is sent to a subtract terminal of a subtractor 46. The output signal from the weighting circuit 31 is sent to a subtract terminal of a subtractor 47 and the output signal from the weighting circuit 36 is sent to another terminal of the same. The subtractor performs the calculation $S_1(2-K_0) - K_1 S_1$ and sends it to another terminal of the subtractor 46. In the subtractor 46, $S_0(2-K_0) - (K_1 S_1 + K_2 S_2 + K_3 S_3 + K_4 S_4 + K_5 S_5)$ is carried out, and thereby the subtractor 46 outputting the sharpness-emphasized picture signal E.

Figure 11:
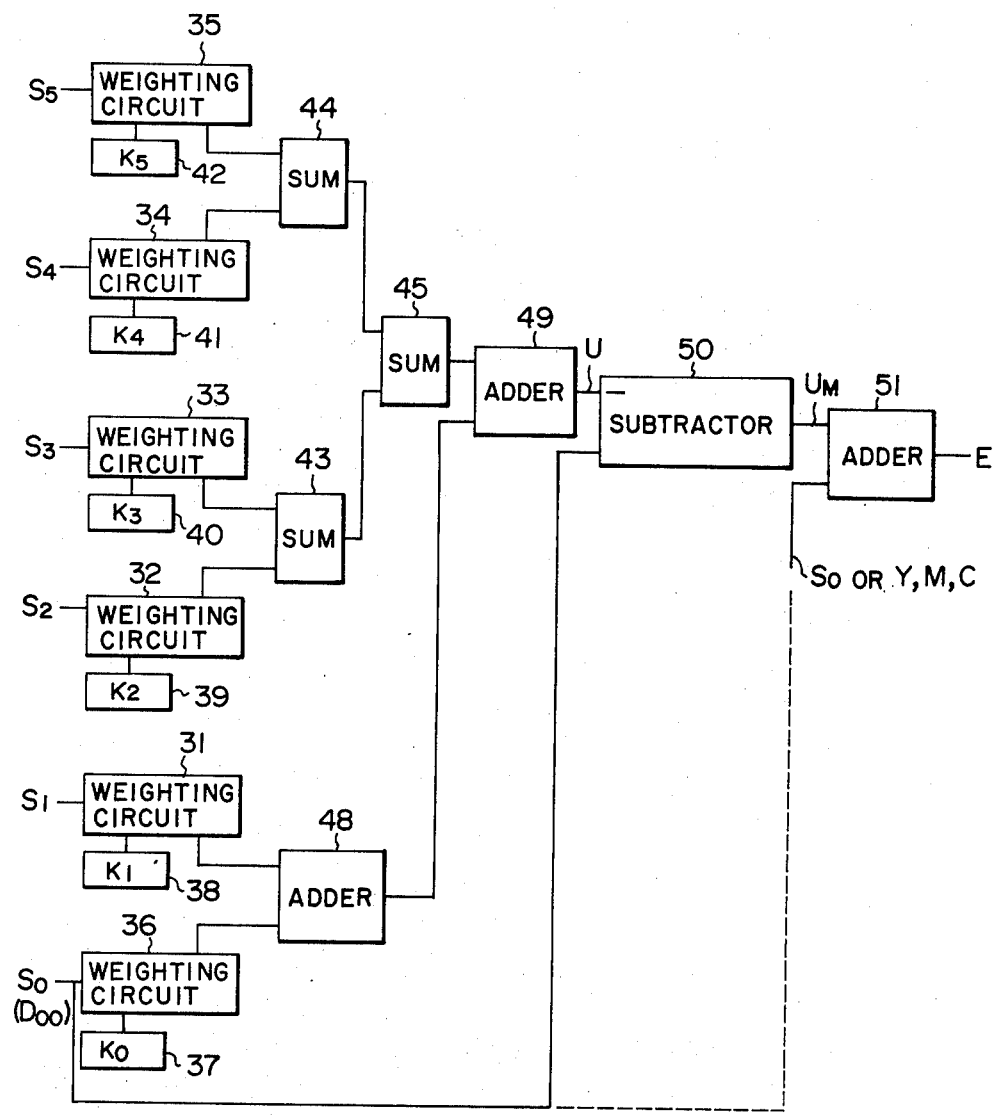
FIG. 11 is a block diagram of another sharpness-emphasized picture signal producer.

In FIG. 11 there is shown another sharpness-emphasized picture signal producer. In this embodiment, the unsharp signal U represented by the formula 1 is first obtained, and then an unsharp mask signal $U_M$ is calculated by subtracting the unsharp signal U from the main signal $S_0$. Then, the unsharp-emphasized picture signal E is obtained by adding the unsharp mask signal $U_M$ to the main signal $S_0$.

That is, the output signals from the weighting circuits 32-35 are summed up by the sum means 43-45 in the same manner as the first embodiment, and the summed value is sent to an adder 49. The output signals from the weighting circuits 31 and 36 are sent to an adder 48 wherein the two output signals are added. The value added in the adder 48 is sent to the adder 49 and is added there to the summed value from the weighting circuits 32-35 to obtain the unsharp signal U.

The main signal $S_0$ and the unsharp signal U are sent to a subtractor 50 wherein the unsharp mask signal $U_M$ is obtained by $S_0 - U$. Then, the unsharp mask signal $U_M$ and the main signal $S_0$ are sent to an adder 51 and added there to obtain the unsharp-emphasized picture signal E.

In this embodiment, the sharpness of other signals than the main signal $S_0$ may also be emphasized. For example, the black signal K from the color operator 13 is directly input to the memory 15 and the unsharp mask signal $U_M$ is produced from the black signal K. Then, the unsharp mask signal $U_M$ and a yellow, magenta or cyan signal selected by the color selector circuit 14 are sent to the adder 51 in which the sharpness of the yellow, magenta or cyan signal is emphasized to obtain the sharpness emphasized picture signal E.

Although the present invention has been described with reference to preferred embodiments thereof, however, various changes and modifications can be made by those skilled in the art without departing from the scope of the present invention.

What is claimed is:

1. A sharpness emphasizing method of picture reproduction for use in a picture reproducing machine wherein an original picture is scanned to pick up a picture signal which is separated into color separation picture element signals of primary colors, and wherein a reproduction picture is produced by using the color separation picture element signal, comprising the steps of:
   (a) picking up a main picture element signal whose sharpness is to be emphasized, and supplemental picture element signals positioned around the main picture element signal;
   (b) weighting the supplemental picture element signals with factors in such a manner that the supplemental picture element signals positioned in the same distance away from the main picture element signal may be weighted with the same factor;
   (c) averaging the supplemental picture element signals weighted to obtain a mean value signal; and
   (d) emphasizing the main picture element signal according to the mean value signal.

2. A method as defined in claim 1 wherein the factors are determined according to a slit function corresponding to frequency characteristics required to the main picture element signal.

3. A method as defined in claim 2 wherein the main picture element signal and the supplemental picture element signals are picked up by circumferential information pickup circuit comprising rows of shift registers.

4. A method as defined in claim 3 wherein groups of the supplemental picture element signals, each group of which are positioned in the same distance away from the main picture element signal and are weighted with the same factor, are averaged by add-average circuits, each comprising adders.

5. A method as defined in claim 1 wherein the main picture element signal and the supplemental picture element signals are picked up by circumferential information pickup circuit comprising rows of shift registers.

6. A methd as defined in claim 5 wherein groups of the supplemental picture element signals, each group of which are positioned in the same distance away from the main picture element signal and are weighted with the same factor, are averaged by add-average circuits, each comprising adders.

7. A method as defined in claim 5 wherein the main picture element signal is emphasized by subtracting the mean value signal from two main picture element signals.

8. A method as defined in any of claims 1, 2, 5, 3 or 4 wherein the main picture element signal is emphasized by subtracting the mean value signal from two main picture element signals.

* * * * *